(No Model.)
F. W. JOHNSON.
RUBBER FOR VEHICLE WHEELS.
No. 374,967. Patented Dec. 20, 1887.
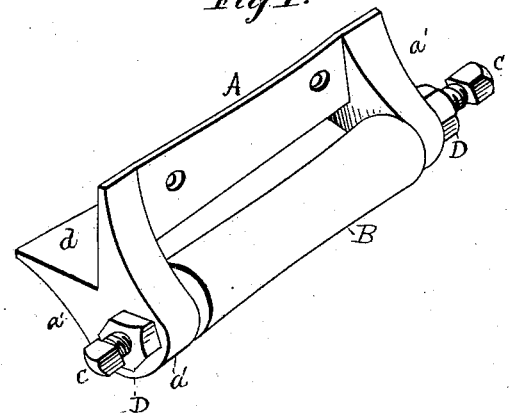
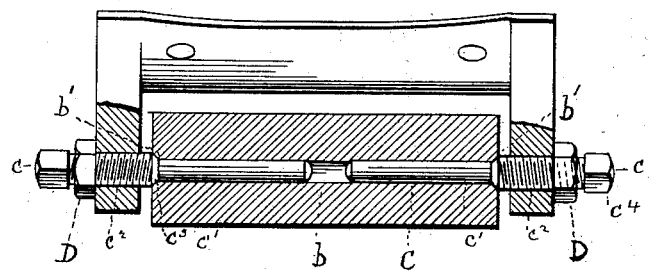
Witnesses.
J. R. Barton.
James Strong.
Inventor
Frank W. Johnson,
By H. T. Fisher.
Attorney.

UNITED STATES PATENT OFFICE.

FRANK W. JOHNSON, OF CLEVELAND, OHIO.

RUBBER FOR VEHICLE-WHEELS.

SPECIFICATION forming part of Letters Patent No. 374,967, dated December 20, 1887.

Application filed August 29, 1887. Serial No. 248,161. (No model.)

*To all whom it may concern:*

Be it known that I, FRANK W. JOHNSON, a citizen of the United States, residing at Cleveland, in the county of Cuyahoga and State of Ohio, have invented certain new and useful Improvements in Rubbers for Vehicle-Wheels; and I do hereby declare that the following is a full, clear, and exact description of the invention, which will enable others skilled in the art to which it appertains to make and use the same.

My invention relates to rubbers for vehicle-wheels; and the object is to provide a rubber to be attached to the body of the wagon, carriage, or like vehicle adapted to take the wear of the wheel in case of short turns, and, while it protects the body of the vehicle from wear, does not offer an obstruction to turning, as in the case of the old-fashioned stationary rubbers.

To this end the invention consists of a bracket to be attached to the vehicle-body, and carrying a suitable roller which takes the wear of the wheel and turns therewith when in use, substantially as hereinafter described, and particularly pointed out in the claim.

In the accompanying drawings, Figure 1 is a perspective of my improved rubber. Fig. 2 is a side view, with the roller and its connections in section to disclose the manner of attaching the same.

A represents a bracket provided, preferably, with a V-shaped groove, $d$, along one side, by which the bracket is bolted or screwed to the angular edge of the vehicle-body, where rubbers are usually placed. Outside of this V-shaped part the bracket has two posts, $a'$, in which is secured a roller, B. This roller is shaped, preferably, as shown, being in plain cylindrical form from end to end and bored axially, as seen at $b$, for the introduction of the sectional spindle or shaft C. For convenience I employ a shaft formed in two sections, $c\ c$, each having a reduced portion, $c'$, which enters the bore of the roller about half-way its length, and an enlarged screw threaded portion, $c^2$, which screws into the post $a'$ of the bracket. The shaft C has right and left screws on its enlarged portions $c^2$, as shown. The roller is countersunk slightly about the bore at each end, as shown at $b'$, and the shaft-sections have a corresponding bevel, as seen at $c^3$, whereby when the sections are screwed inward they will take up any wear upon the roller and prevent rattling and noise. Jam-nuts D are provided for the shaft-sections outside the bracket, and said sections have small heads $c^4$ at the outer ends for convenience of turning them in either direction.

By this construction I provide a rubber for a wagon or carriage which not only affords the very best protection to the body thereof against injury by the wheel, but also protects the wheel from injury by the rubber.

It is well known that the old-fashioned iron rubber soon has a cavity worn into it by the severe abrasion of the wheel. The edges of this cavity or cut wear upon the fellies of the wheel, scraping off the paint and otherwise marring and injuring the same. By introducing a roller in the manner shown by me I not only succeed in protecting the vehicle-body, but also the wheel, as the roller will turn under the action of the wheel, and thus avoid the frictional wear, which otherwise would cut a recess therein. This construction also greatly facilitates turning, as it prevents the locking of the wheel and the strain on the vehicle and team, which occur when the old style of rubber is used.

I do not wish to confine myself strictly to the construction here shown, as modifications or different forms thereof obviously might be made without departing from the spirit of my invention.

Having thus described my invention, what I claim as new, and desire to secure by Letters Patent, is—

In a wheel rubber or fender, a bracket having a V-shaped groove along one side and posts at its ends having screw-threaded holes, in combination with a roller bored longitudinally through its center and countersunk about the bore at its ends, a sectional shaft on which the roller is supported, each section having an enlarged screw-threaded portion engaging the posts of the bracket and extending into the roller to near the center thereof, and a jam-nut on each section outside the bracket, substantially as set forth.

FRANK W. JOHNSON.

Witnesses:
H. T. FISHER,
GEO. W. MCDONALD.